UNITED STATES PATENT OFFICE.

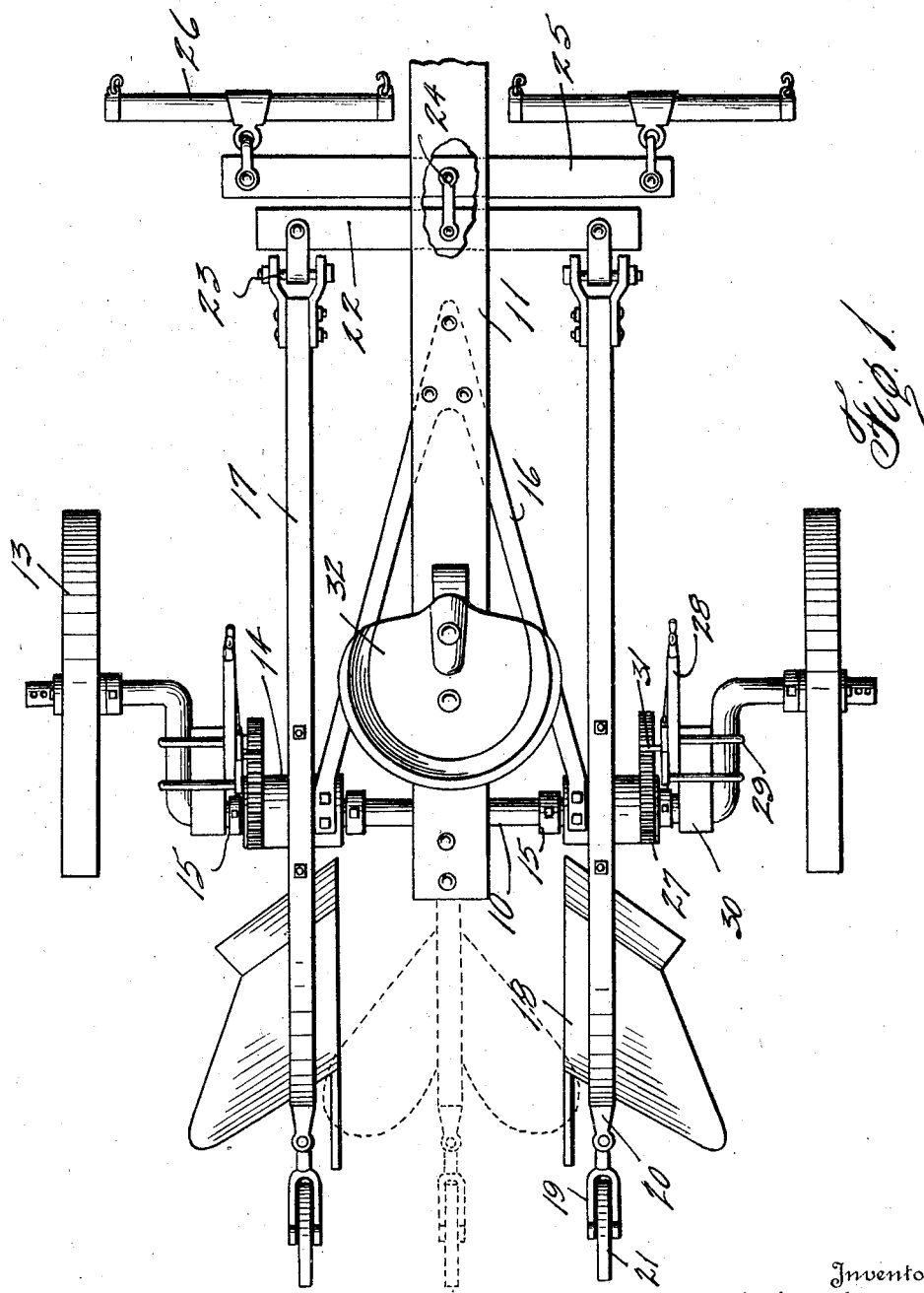

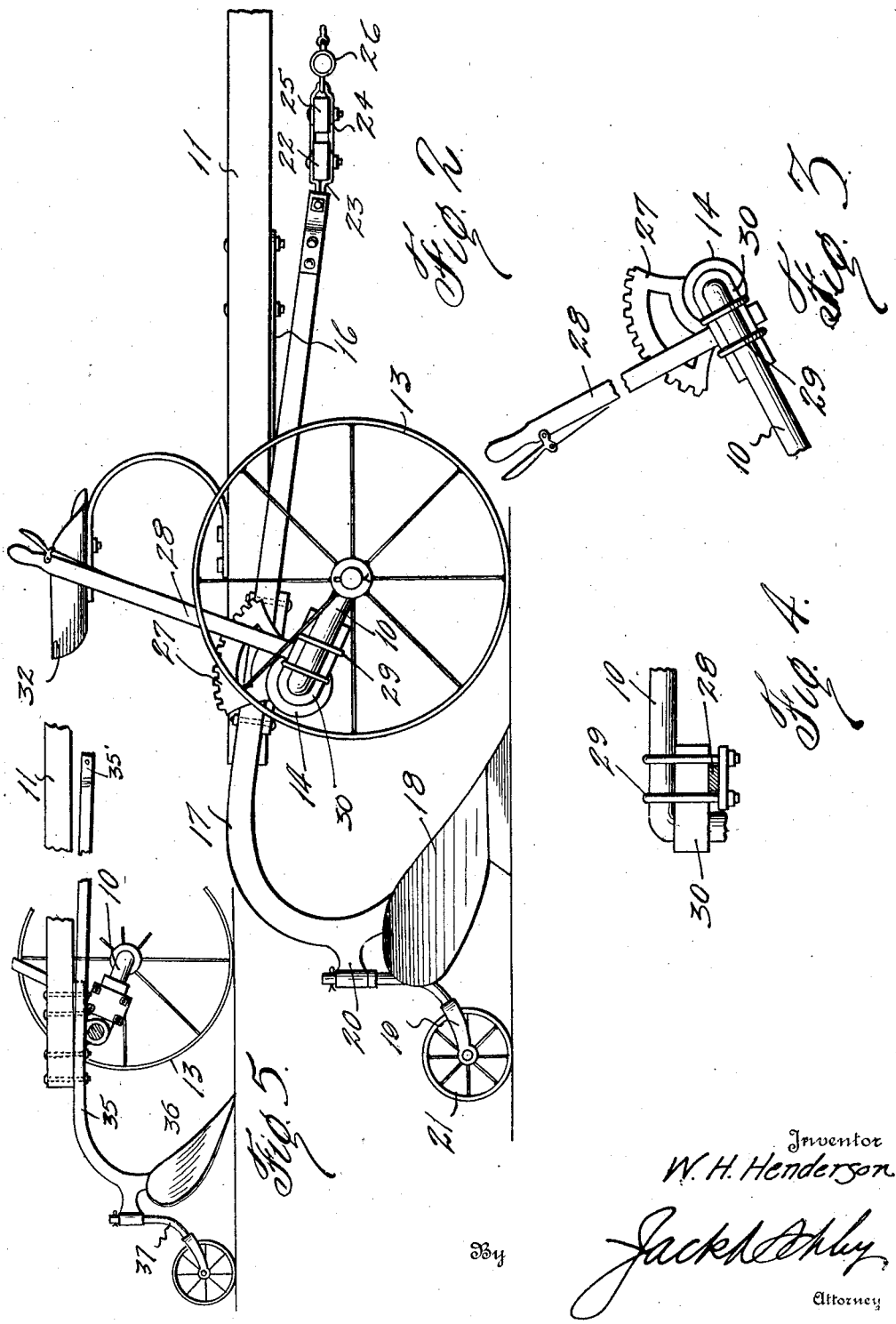

WARREN H. HENDERSON, OF LUBBOCK, TEXAS.

PLOW.

1,360,636.  Specification of Letters Patent.  Patented Nov. 30, 1920.

Application filed March 26, 1920. Serial No. 368,882.

*To all whom it may concern:*

Be it known that I, WARREN H. HENDERSON, a citizen of the United States, residing at Lubbock, in the county of Lubbock and State of Texas, have invented certain new and useful Improvements in Plows, of which the following is a specification.

This invention relates to new and useful improvements in plows.

The aim of the invention is to provide a plow especially adapted for preparing the soil for planting and to be arranged so as to plow two furrows at a time whereby considerable labor and time is saved.

In carrying out the invention an arched axle mounted on ground wheels is pivoted to the rear end of a tongue. Plow beams are also pivoted on the axle so that by adjusting the axle the plowing depth can be regulated. Means is provided for swinging the axle to adjust the same. A whiffletree is connected to the forward ends of the plow beams under the tongue but is not connected with the tongue and the draft is applied to these beams and thus directly to the plow, the tongue acting merely as a steering or guiding means. The ground wheels are arranged for lateral adjustment so that the plow may be used for rows of different widths. The plow beam may be removed and a lister or bursting plow may be attached to the tongue or center of the axle so as to lift the ground after it has been treated by the turning plow.

Follower wheels support the rear of the plow beams. Other novel features and details will be hereinafter more particularly pointed out.

The invention will be more readily understood from a reading of the following specification and by reference to the accompanying drawings, in which an example of the invention is shown, and wherein:

Figure 1 is a plan view of a plow constructed in accordance with my invention,

Fig. 2 is a side elevation of the same,

Fig. 3 is a detail of one of the adjusting levers,

Fig. 4 is a detail showing the connection between the lever and the axle, and Fig. 5 is a detail with the lister in place.

In the drawings the numeral 10 designates an arched axle pivoted at its central portion to the rear end of a tongue 11. The axle is supported in ground wheels 13 which are laterally adjustable on the axle so as to permit the plow to be used in forming rows of different widths. Sleeves 14 are mounted on the upper portion of the axle on each side of the tongue and confined between collars 15. The axle is free to swing in the sleeves. A brace member 16 fastened to the underside of the tongue has its end secured to the inner ends of the sleeves.

By this arrangement the sleeve and the tongue are tied together.

The sleeves are suitably fastened to the underside of plow beams 17 extending in parallel relation on each side of the tongue. The beams extend rearwardly of the axle and carry turning plows 18 on their lower ends. The plows are arranged to throw the dirt to the right and left respectively and leave an unplowed strip for center therebetween. Yokes 19 are pivoted in brackets 20 extending rearwardly from the beams 17 and follower wheels 21 are mounted in the yokes so as to trail or follow behind the plows in the furrows and support said plows as will be obvious. An evener bar 22 is connected at each end by means of clevises 23 with the forward ends of the beams 17. This bar extends transversely under the tongue and is pivotally connected at its center by means of a link 24 with the center of a whiffletree 25 to the ends of which swingletrees 26 are pivotally connected on each side of the tongue. It will be seen that the draft from the team is applied directly to the plow beams 17 and the plow is not pulled by the tongue 11 which latter merely acts as a steering means and a connecting and supporting element for the axle and the sleeves 14.

Each sleeve has fixed to its outer end a locking segment 27. To each side member of the axle a lever 28 is secured by U-bolts 29 as is shown in detail in Figs. 3 and 4. A spacing block 30 fits on the axle and is interposed between the side member of the axle and the lever on each side. Each lever is in close relation to one of the segments and carries a locking plunger 31 adapted to engage in the segment and lock the lever in position. It will be seen that by withdrawing the locking plungers the levers may be swung and the axle thus swung. By swinging the axle it is raised and lowered thus raising or lowering the beams 17 and regulating the depth of the plowing. The levers not only act to adjust the axle but in connection with the plungers 31 and the segments maintain the axle in its adjusted position.

In using the plow a seat 32 is provided on the tongue for the driver. As the plow is pulled by the team the plows 18 throw the dirt to the right and to the left respectively thus turning over the same, but leaving an unplowed center therebetween. By this arrangement two rows are plowed at the same time and the work is quickly done. After the field has been plowed with the turning plows the beams 17 and their plows 18 are removed. A lister beam 35 is suitably fastened to the axle under the tongue and a suitable draft connection 35' is provided at the front end of the beam. The beam carries a lister or middle breaker 36 and a follower wheel 37. This arrangement is used to plow the ground after it has been broken by the turning plows. With this arrangement the land can be bedded very quickly and satisfactorily.

What I claim, is:

1. In a plow, the combination of an arched axle, plow beams adjustably connected with the axle, means for adjusting the axle vertically to regulate the depth of the plowing, ground wheels supporting the axle, a tongue pivoted to the axle and extending forwardly, a connecting bar pivoted to the forward end of the plow beams, a whiffletree pivoted to the connecting bar, and swingletrees pivoted to the whiffletree, the connecting bar and whiffletree being free from the tongue.

2. In a plow, an arched axle, ground wheels supporting the axle, sleeves confined on the axle and in which the latter is free to turn, a tongue pivoted to the axle between the sleeves, a brace extending from the tongue to the sleeves, plow beams on each side of the tongue fastened to the sleeves, plows on the lower ends of the beams in rear of the axle, a draft connection attached to the forward ends of the beams and free from the tongue, locking segments carried by the sleeves, adjusting levers fastened to the axle, and locking plungers carried by the levers and engaging the segments.

3. In a plow, an arched axle, ground wheels supporting the axle, sleeves combined on the axle and in which the latter is free to turn, a tongue pivoted to the axle between the sleeves, a brace extending from the tongue to the sleeves, plow beams on each side of the tongue fastened to the sleeves, plows on the lower ends of the beams in rear of the axle, a draft connection attached to the forward ends of the beams and free from the tongue, locking segments carried by the sleeves, adjusting levers fastened to the axle, locking plungers carried by the levers and engaging the segments, and follower wheels pivoted to the rear end of the plow beams in rear of the plows.

In testimony whereof I affix my signature.

WARREN H. HENDERSON.